US012586701B2

(12) United States Patent
Seki

(10) Patent No.: US 12,586,701 B2
(45) Date of Patent: Mar. 24, 2026

(54) COMPLEX MAGNETIC COMPOSITION, MAGNETIC MEMBER, AND ELECTRONIC COMPONENT

(71) Applicant: TDK CORPORATION, Tokyo (JP)

(72) Inventor: Junichi Seki, Tokyo (JP)

(73) Assignee: TDK CORPORATION, Tokyo (JP)

( * ) Notice: Subject to any disclaimer, the term of this patent is extended or adjusted under 35 U.S.C. 154(b) by 647 days.

(21) Appl. No.: 18/179,450

(22) Filed: Mar. 7, 2023

(65) Prior Publication Data

US 2023/0317336 A1 Oct. 5, 2023

(30) Foreign Application Priority Data

Mar. 31, 2022 (JP) ................................ 2022-059123

(51) Int. Cl.

| | |
|---|---|
| ***H01F 1/28*** | (2006.01) |
| ***H01F 3/08*** | (2006.01) |
| ***H01F 5/00*** | (2006.01) |

(52) U.S. Cl.

CPC ................ *H01F 1/28* (2013.01); *H01F 3/08* (2013.01); *H01F 5/00* (2013.01)

(58) Field of Classification Search

CPC ................ H01F 1/28; H01F 3/08; H01F 5/00

See application file for complete search history.

(56) References Cited

FOREIGN PATENT DOCUMENTS

| | | | |
|---|---|---|---|
| JP | 2019-210362 | * | 12/2019 |
| JP | 2019-210362 | A | 12/2019 |
| JP | 2019-212664 | A | 12/2019 |
| JP | 2021-187894 | A | 12/2021 |
| WO | WO 2023/022046 | * | 2/2023 |

* cited by examiner

*Primary Examiner* — C Melissa Koslow

(74) *Attorney, Agent, or Firm* — Oliff PLC

(57) ABSTRACT

A complex magnetic composition 10 includes a binder 14 including a bisphenol type epoxy resin with restricted molecular rotation and magnetic particles 12 bound together by the binder 14.

12 Claims, 3 Drawing Sheets

COMPLEX MAGNETIC COMPOSITION, MAGNETIC MEMBER, AND ELECTRONIC COMPONENT

TECHNICAL FIELD

The present invention relates to a complex magnetic composition that constitute a magnetic member used as part of magnetism application type electronic components, such as inductors, reactors, transformers, contactless power supply coils, and magnetic shielding.

BACKGROUND

A dust core is known as a typical example of the magnetic member used as part of the magnetism application type electronic components. The dust core is used as, for example, a magnetic core of inductors. The dust core is produced by, for example, pressure-molding a dust core precursor including granules of a complex magnetic composition in which magnetic particles are bound together by a binder resin.

For example, electronic components used in a high-temperature environment require, particularly, heat resistance. For such a reason, it is suggested that a binder resin included in a magnetic member of such electronic components should be a resin having a high glass-transition temperature (Tg) as shown in, for example, Patent Document 1 or Patent Document 2.

Unfortunately, the resin having a high glass-transition temperature typically has low resistance to thermal decomposition and tends to be degraded when the resin is exposed to a high-temperature environment for a long time. For example, for the magnetic member requiring high reliability for in-vehicle use, reduced degradation of properties of the magnetic member over long-term use in a high temperature environment has been in demand.

Patent Document 1: JP Patent Application Laid Open No. 2019-210362

Patent Document 2: JP Patent Application Laid Open No. 2019-212664

SUMMARY

The present invention has been achieved under such circumstances. It is an object of the present invention to provide a magnetic member having high heat resistance and high reliability with reduced degradation of properties over long-term use; a complex magnetic composition that constitutes the magnetic member; and an electronic component including the magnetic member.

To achieve the above object, a complex magnetic composition according to the present invention includes:

a binder including a bisphenol type epoxy resin with restricted molecular rotation; and magnetic particles bound together by the binder.

The present inventors have diligently sought to achieve the magnetic member having high heat resistance and high reliability with reduced degradation of properties over long-term use. The present inventors have finally found that the complex magnetic composition composed of a combination of the specific resin and the magnetic particles increases the reliability of the magnetic member and completed the present invention.

Preferably, the bisphenol type epoxy resin includes molecules having an amide structure. Preferably, the bisphenol type epoxy resin includes aromatic rings having a conjugated structure. The bisphenol type epoxy resin may include aromatic rings conjugated via an imide bond.

Preferably, the magnetic particles include metal magnetic particles. The present inventors have confirmed that, in particular, a combination of the metal magnetic particles and the specific epoxy resin can reduce degradation of the properties over long-term use in a high temperature environment. This may be because a negative catalysis has occurred between the metal magnetic particles and the specific binder resin.

Preferably, the metal magnetic particles contain amorphous metal. Preferably, the metal magnetic particles contain pure Fe. Preferably, the magnetic particles are spherical.

A magnetic member of the present invention includes the above-mentioned complex magnetic composition. An electronic component of the present invention includes the above-mentioned magnetic member. The above-mentioned magnetic member is not limited and may be, for example, a dust core. The dust core may include a coil inside.

BRIEF DESCRIPTION OF THE DRAWING(S)

DETAILED DESCRIPTION

Hereinafter, an embodiment of the present invention will be explained.

Figure 1:
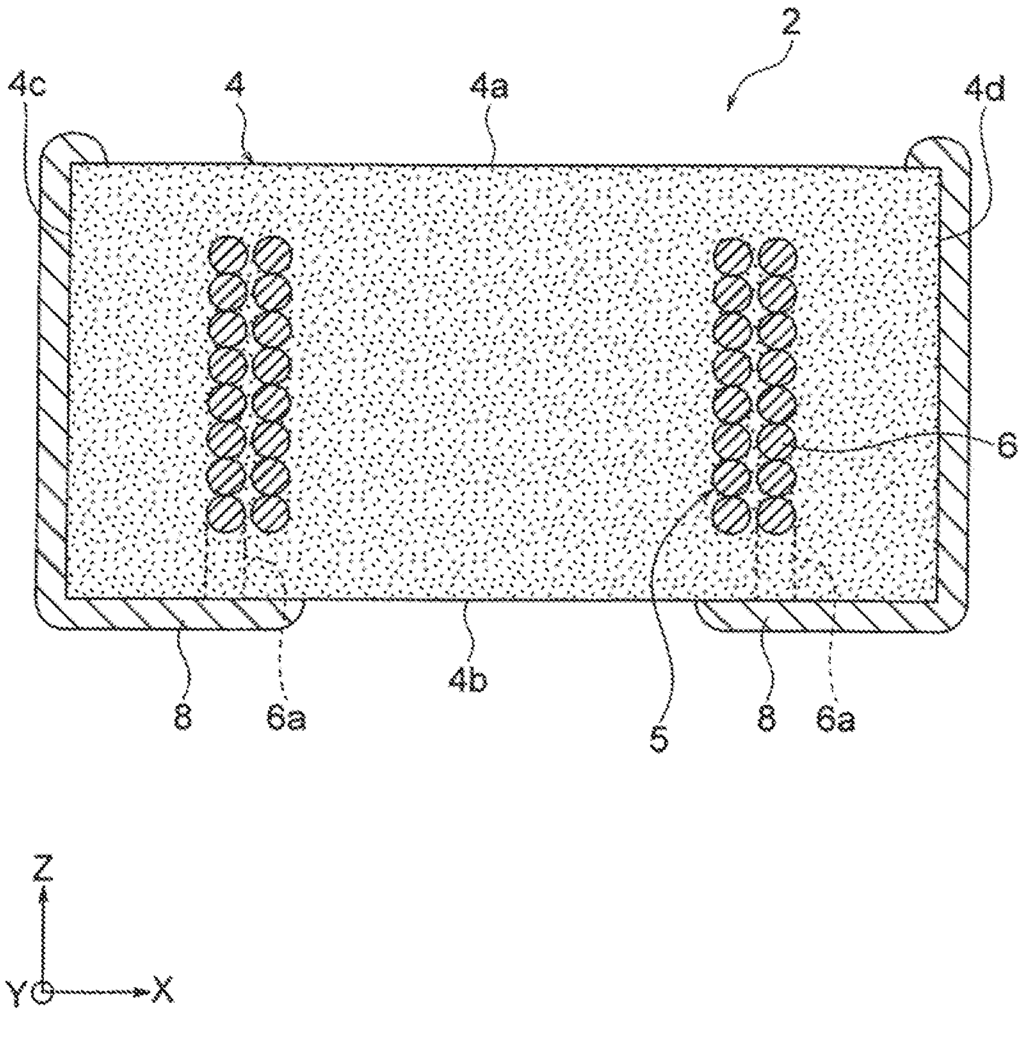
FIG. 1 is a schematic sectional view of an electronic component according to an embodiment of the present invention.

As shown in FIG. 1, an inductor 2 as an electronic component according to the embodiment of the present invention includes an element body 4 having a substantially rectangular parallelepiped shape (substantially hexahedral shape).

The element body 4 includes an upper surface **4*a*, a bottom surface 4*b* located opposite the upper surface 4*a* in a Z-axis direction, end surfaces 4*c* and 4*d*** located opposite each other along an X-axis, and end surfaces (not shown in the drawings) located opposite each other along a Y-axis.

A pair of terminal electrodes 8 is formed on the bottom surface **4*b* of the element body 4. The pair of terminal electrodes 8 is formed separately from each other in the X-axis direction and is insulated from each other. Each of the terminal electrodes 8 is formed so that it continues not only on the bottom surface 4*b* of the element body 4 but also towards the end surface 4*c* or 4*d*** nearby.

An external circuit can be connected to the terminal electrodes 8 of the inductor 2 of the present embodiment through interconnection (not shown in the drawings), such as wiring. Additionally, the inductor 2 can be mounted on various substrates (e.g., circuit substrates) using a joining member (e.g., solder and conductive adhesive). When the inductor 2 is mounted on a substrate, the bottom surface **4*b* of the element body 4 becomes a mounting surface, and the terminal electrodes 8** are joined to the substrate using a joining member.

The element body 4 includes a coil 5 inside. The coil 5 is made of a wire 6 as a conductor wound in a coil shape. Although the coil 5 is an air core coil wound in a typical normal-wise manner in FIG. 1 of the present embodiment, the wire 6 may be wound in any manner. For example, the coil 5 may be an α-winding air core coil, a flat winding air core coil, or an edgewise wound air core coil.

The wire 6 is composed of a conductor portion that mainly contains low resistance metal (e.g., copper) and an insulating layer covering an outer periphery of the conductor portion. More specifically, the conductor portion is made of, for example, pure copper (e.g., oxygen-free copper and tough pitch copper), an alloy containing copper (e.g., phosphor bronze, brass, red brass, beryllium copper, and a silver-copper alloy), or a copper-coated steel wire.

The insulating layer is made from any electrically insulating material. Examples of the material include an epoxy resin, an acrylic resin, polyurethane, polyimide, polyamide-imide, polyester, nylon, and a synthetic resin in which at least two of the above resins are mixed.

Although the wire 6 of the coil 5 of the present embodiment is a round wire whose conductor portion has a circular sectional shape as shown in FIG. 1, the wire 6 is not limited to a round wire and may be a flat wire or the like. A pair of lead portions 6*a* at both ends of the wire 6 is exposed from the coil 5 to an outer surface (e.g., the bottom surface 4*b*) of the element body 4 and is connected to the terminal electrodes 8. Although the lead portions 6*a* are made of the wire 6, at locations of the lead portions 6*a* exposed to the bottom surface 4*b*, the insulating layer at an outer periphery of the wire 6 is removed to have its conductor portion exposed.

In the present embodiment, the terminal electrodes 8 may include a resin electrode layer. Additionally, the terminal electrodes 8 may have a multilayer structure including the resin electrode layer and another electrode layer. When the terminal electrodes 8 have the multilayer structure, the resin electrode layer is positioned so as to be in contact with the bottom surface 4*b* of the element body 4, and the other electrode layer may include a single layer or a plurality of layers made of any material.

For example, the other electrode layer can be made of a metal (e.g., Sn, Au, Cu, Ni, Pt, Ag, and Pd) or an alloy containing at least one of these metal elements and can be formed by plating or sputtering. The terminal electrodes 8 as a whole have a thickness of preferably 3 to 60 μm on average, and the resin electrode layer has a thickness of preferably 1 to 50 μm.

The resin electrode layer of the terminal electrodes 8 includes a resin component and a conductor powder. The resin component in the resin electrode layer is composed of a thermosetting resin (e.g., an epoxy resin and a phenol resin). The conductor powder can be composed of a metal powder (e.g., Ag, Au, Pd, Pt, Ni, Cu, and Sn) or an alloy powder containing at least one of these elements. Preferably, the conductor powder contains particularly Ag as a main component.

The conductor powder can have a nearly spherical shape, a long spherical shape, an irregular block shape, a needle shape, or a flat shape and preferably has, in particular, the needle shape or the flat shape. In the present embodiment, flat shaped particles mean particles having an aspect ratio (ratio of a length in a longitudinal direction to a length in a short-side direction) of 2 to 30 in a cross section of the resin electrode layer. The average particle size of the conductor powder can be measured by observing the cross section of the resin electrode layer with a SEM or a STEM and performing image analysis of a sectional photograph. In this measurement, the average particle size of the conductor powder is calculated in terms of a maximum length.

Figure 2:
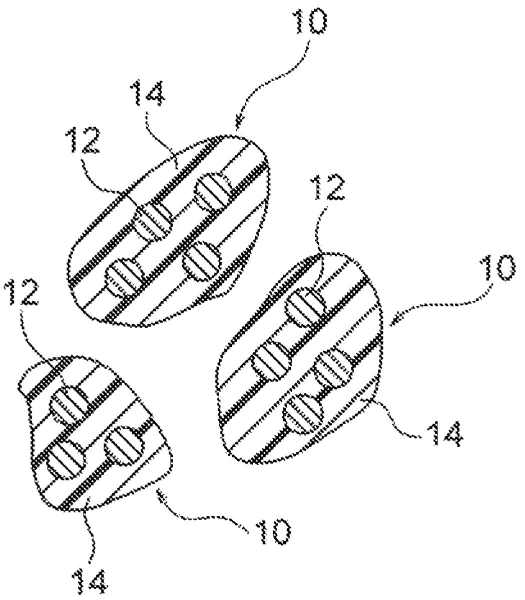
FIG. 2 is a schematic view of granules (complex magnetic composition) including a magnetic material that are used for manufacturing an element body (a dust core) of the electronic component shown in FIG. 1.

For example, the element body 4 of the present embodiment is composed of a dust core and is formed by pressure-molding a dust core precursor containing granules 10 shown in FIG. 2 together with the air core coil having the wire 6. The granules 10 are composed of a complex magnetic composition that includes a binder 14 and magnetic particles 12 bound together by the binder 14. Details of the binder 14 will be explained later.

The magnetic particles 12 are made from any magnetic material and are preferably metal magnetic particles. Examples of the metal include pure iron, an Fe—Ni based alloy, an Fe—Si based alloy, an Fe—Co based alloy, an Fe—Si—Cr based alloy, an Fe—Si—Al based alloy, amorphous metal, a nano-crystalline alloy containing Fe, other soft magnetic alloys, and their combinations. A subcomponent may be added to the magnetic particles 12 as appropriate.

The magnetic particles 12 to be included in the element body 4 can have a median diameter (D50) of about 0.1 to about 100 μm. The magnetic particles 12 may include a mixture of large particles with a D50 of 10 to 50 medium particles with a D50 of 1 to 9 and small particles with a D50 of 0.3 to 0.9 μm. A combination of the large particles and the medium particles, a combination of the large particles and the small particles, a combination of the medium particles and the small particles, or the like may be used other than the combination of the three types (particle groups) of particles as described above. The large particles, the medium particles, and the small particles may be made from the same material or different materials.

When the particle groups are mixed as described above, a content ratio of each particle group is not limited. For example, when the three particle groups (the large particles, the medium particles, and the small particles) are mixed, the large particles occupy preferably 5% to 30%, the medium particles occupy preferably 0% to 30%, and the small particles occupy preferably 50% to 90% of a total area (100%) of the large particles, the medium particles, and the small particles in a cross section of the element body 4. Including the particle groups in the magnetic particles 12 allows for increase of the packing density of the magnetic particles 12 in the element body 4. As a result, various properties of the inductor 2 improve, such as permeability, eddy current loss, and DC bias characteristics.

Sizes of the magnetic particles 12 and areas of the respective particle groups can be measured by observing the cross section of the element body 4 with a scanning electron microscope (SEM), a scanning transmission electron microscope (STEM), or the like and performing image analysis of a given sectional photograph with software. At this time, the sizes of the magnetic particles 12 are preferably measured in terms of equivalent circular diameters.

Preferably, the magnetic particles 12 have a nearly spherical shape. The magnetic particles 12 may include those having an irregular shape, together with those having a spherical shape.

Note that "spherical" indicates an average circularity of 0.9 or more, where the average circularity denotes a circularity at which 50% is reached in a cumulative distribution of the circularity of the magnetic particles 12 observed in a fracture surface of the element body 4 (dust core). The circularity is calculated by a known method (e.g., sectional image analysis).

The magnetic particles 12 that are made of metal in the element body 4 may be insulated from each other. Examples of insulating methods include formation of an insulating coating on a particle surface. Examples of the insulating coating include a film formed from a resin or an inorganic material and an oxidized film formed by oxidizing the particle surface through heating. When the insulating coating is formed from a resin or an inorganic material, the resin may be a silicone resin, an epoxy resin, or the like.

Examples of the inorganic material include phosphates (e.g., magnesium phosphate, calcium phosphate, zinc phosphate, and manganese phosphate), silicates (e.g., sodium silicate (water glass)), soda lime glass, borosilicate glass, lead glass, aluminosilicate glass, borate glass, and sulfate glass. Note that the insulating coating of the metal particles 12 has a thickness of preferably 5 to 200 nm. Forming the insulating coating can improve insulation properties among the particles and a withstand voltage of the inductor 2.

A method of manufacturing the element body 4 will be explained. The dust core precursor to be a raw material of the element body 4 (dust core) shown in FIG. 1 is prepared. The dust core precursor includes the granules 10 shown in FIG. 2 and, as necessary, other additives. Examples of the additives include molding lubricants and flowability agents. Examples of the molding lubricants include zinc stearate, lithium stearate, strontium stearate, barium stearate, and magnesium stearate. Examples of the flowability agents include fine silica, fumed silica, and colloidal silica.

The granules shown in FIG. 2 are given by, for example, kneading a soft magnetic powder containing the magnetic particles 12 that are made of metal and have the insulating coating and a binder diluted with a solvent and then drying them. The given granules may be sieved with a sieve having an opening of, for example, 100 to 400 μm.

Examples of the solvent with which to dilute the binder when the granules 10 are produced include ketones (e.g., acetone) and ethanol. As the binder 14, a specific epoxy resin (explained later) is used in the present embodiment. Although the amount of the binder 14 is not limited, for example, the amount is preferably 2 to 5 parts by weight with respect to 100 parts by weight of the magnetic particles 12. By kneading the binder at this ratio, the packing density of the magnetic particles 12 in the element body 4 to be given (excluding the wire 6) becomes about 70 to about 90 vol %. The binder 14 (resin) included in the granules 10 may be under a condition before hardening (e.g., not hardened or semi-hardened).

A mold is filled with the granules 10 and the air core coil (the coil 5) as an insert member, and compression pressure molding is performed, which gives a compact having the shape of the element body 4. By appropriately heating this compact, the binder 14 (resin) hardens, which gives the element body 4 composed of the dust core. Heating conditions are appropriately determined in accordance with the type of the binder 14. Because the coil 5 is embedded inside the element body 4 composed of the dust core given in such a manner, applying a voltage to the coil 5 allows for functioning as the inductor 2.

In the present embodiment, the binder 14 included in the granules 10 shown in FIG. 2 mainly contains an epoxy resin having a bisphenol type skeleton with restricted molecular rotation represented by Chemical Formula 1 shown below. Note that, in 100 mass % of the binder 14 as a whole, at least 20 mass % of the binder 14 is preferably the epoxy resin represented by Chemical Formula 1, and other resins may also be contained. Examples of the other resins include hardening accelerators and hardening agents that easily form an orientational structure with specific epoxy resins mentioned below. Examples of the hardening agents include those having a naphthalene skeleton and those having a biphenyl skeleton. Examples of the hardening accelerators include imidazole based resins.

Chemical Formula 1

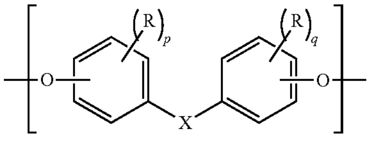

(1)

Note that, in Chemical Formula 1, "R" represents any of a hydrogen atom, a C1 to C6 alkyl group, and a C1 to C6 alkoxy group or a combination thereof, and "p" and "q" each represent an integer greater than or equal to 0. That is, at least one "R" in Chemical Formula 1 may be omitted from Chemical Formula 1. "X" in Chemical Formula 1 has a cyclic structure shown in Chemical Formula 2 or Chemical Formula 3. "X" and ring A and/or "X" and ring B (explained later) are preferably condensed.

Chemical Formula 2

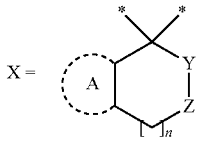

(2)

In Chemical Formula 2, "Y" represents O, NH, $NR^1$, $CR^1R^2$, or $SiR^1R^2$; "Z" represents a carbonyl group, a methylene group, or an ester group; and "n" represents an integer greater than or equal to 0. $R^1$ and $R^2$ each independently represent a hydrogen atom, a methyl group, an aromatic ring, or an imide ring. Note that, "*" in Chemical Formula 2 represents a bonding site.

Chemical Formula 3

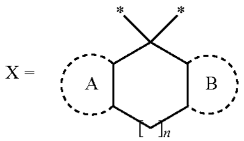

(3)

In Chemical Formula 3, "n" represents an integer greater than or equal to 0, and "*" represents a bonding site.

Each of the rings A and B is an aromatic ring that may have a substituent. The aromatic ring represented by the ring A or B may independently be a carbocyclic ring composed of carbon atoms or a heterocyclic ring composed of heteroatoms (e.g., oxygen atoms, nitrogen atoms, and sulfur atoms) in addition to carbon atoms, but is preferably a carbocyclic ring. The aromatic ring represented by the ring A or B is preferably a three to ten-membered aromatic ring. Aromatic rings represented by the ring A or B include not only a monocyclic aromatic ring and/or a condensed ring of two or more monocyclic aromatic rings, but also a condensed ring of one or more monocyclic aromatic rings and one or more monocyclic non-aromatic rings.

Preferable examples of the carbocyclic ring represented by the ring A or B include a benzene ring, an indene ring, a naphthalene ring, an azulene ring, a heptalene ring, a biphenylene ring, an as-indacene ring, an s-indacene ring, an acenaphthylene ring, a fluorene ring, a phenalene ring, a phenanthrene ring, an anthracene ring, a fluoranthene ring, an acephenanthrylene ring, an aceanthrylene ring, a triphenylene ring, a pyrene ring, a chrysene ring, a tetracene ring, a pleiadene ring, a picene ring, a perylene ring, a pentaphene ring, a pentacene ring, a tetraphenylene ring, and a hexaphene ring.

More preferably, the carbocyclic ring is a benzene ring, a naphthalene ring, a phenanthrene ring, an anthracene ring, a triphenylene ring, a pyrene ring, a chrysene ring, a tetracene ring, a picene ring, or a pentacene ring. Still more preferably, the carbocyclic ring is a benzene ring.

Preferable examples of the heterocyclic ring represented by the ring A or B include a pyridine ring, a pyridazine ring, a pyrimidine ring, a pyrrole ring, a furan ring, a benzofuran ring, an imidazole ring, a thiophene ring, a thiazole ring, a condensed ring of any of these rings and one or more above-mentioned aromatic rings, and a condensed ring of any of these rings and one or more non-aromatic rings.

As the epoxy resin identified as above, a single kind of resin satisfying any of the above-mentioned structures or a combination of two or more kinds of such resin may be used. The epoxy resin identified as above preferably has aromatic rings having a conjugated structure. The aromatic rings are preferably conjugated via an imide bond. Alternatively, molecules of the epoxy resin identified as above preferably have an amide structure.

Using the granules 10, which include the binder 14 containing the specific epoxy resin according to the present embodiment and the magnetic particles 12, to form the compressed compact (the element body 4) allows for, for example, prevention of adherence of the compressed compact to a cavity surface of the mold, damage to the compressed compact. Also, the glass-transition temperature (Tg) of the element body 4 can be increased to improve heat resistance of the inductor 2. The glass-transition temperature of the element body 4 including the above-mentioned specific epoxy resin (after hardening) can be measured by, for example, differential scanning calorimetry (DSC) and may preferably be 170° C. or higher.

Further, in the present embodiment, degradation of properties of the element body 4 in a high-temperature environment can be reduced, which allows for excellent reliability of the inductor 2. Examples of the reduction of degradation of properties of the element body 4 in a high-temperature environment include reduction of changes in permeability and weight change rate of the element body 4. Additionally, the withstand voltage of the element body 4 increases. In a field such as in-vehicle application that requires particularly high reliability, a higher withstand voltage is preferable.

The present invention is not limited to the above-mentioned embodiment and can variously be modified within the scope of the present invention.

For example, the magnetic particles 12 may be not only metal (including alloy) magnetic particles but also ferrite particles (other than metal).

The electronic component is not limited to a coil component (e.g., the inductor 2) including the element body 4 composed of the dust core having the coil 5 embedded. The electronic component may be other coil components, such as a coil component including the wire 6 wound around a dust core having no embedded coil. Electronic components that can be manufactured using the granules 10 of the above-mentioned embodiment are not limited to inductors or electronic components (e.g., reactors, transformers, and contactless power supply devices) having a magnetic core and may be, for example, magnetic shielding components in which a magnetic member other than a magnetic core is used.

EXAMPLES

Hereinafter, the present invention will be explained based on further detailed examples, but the present invention is not to be limited thereto.

Example 1

A dust core precursor including granules 10 containing magnetic particles 12 and a binder 14 as shown in FIG. 2 was produced. As the binder 14, a bisphenol type epoxy resin with restricted molecular rotation represented by Chemical Formulae 4 and 5 shown below, which were more specific than above-mentioned Chemical Formulae 1 and 2, was used.

Specifically, 100 parts by mass of the epoxy resin, 50 parts by mass of a biphenyl aralkyl type phenol resin as a hardening agent, and 1 part by mass of 2-Ethyl-4-methyl-imidazole as a hardening accelerator were dissolved in a solvent composed of acetone to produce paint.

Chemical Formula 4

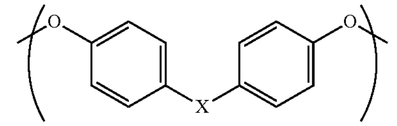

(4)

Chemical Formula 5

X =

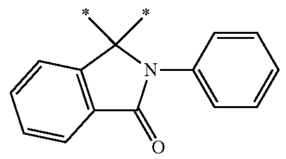

(5)

The paint and the magnetic particles 12 were mixed, kneaded with a kneader, and dried to give the dust core precursor including the granules 10. As the magnetic particles 12, a mixed metal powder including 75 mass % Fe—Si—Cr—B—C composition based amorphous metal powder with a D50 of 25 μm and 25 mass % pure Fe powder with a D50 of 4 μm was used.

The amount of the binder was adjusted so that the binder was 3 parts by mass with respect to 100 parts by mass of the mixed metal powder. The granules 10 were compression molded in a mold having a temperature of 120° C. at a pressure of 400 MPa into a toroidal shape having an outer diameter of 18 mm and an inner diameter of 10 mm. The molded article was heat-hardened at 180° C. for one hour to give a toroidal dust core (magnetic member with no embedded coil) sample. The dust core sample was subjected to the following measurement.

<Rate of Change of Core Weight>

The dust core sample was exposed to an environment at 180° C. for 660 hours, and the rate of change of core weight (before exposure to after exposure) was calculated. Table 1 shows the results. The closer the rate of change of core weight is to 0, the more preferable it is.

<Relative Permeability>

A wire was wound around the dust core sample to form a closed magnetic circuit, and the relative permeability μ was measured with an LCR meter at a frequency of 100 kHz and 50 mV Table 1 shows the results.

<Rate of Change of Relative Permeability (μ)>

The dust core sample was exposed to an environment at 180° C. for 1100 hours, and the rate of change (%) of relative permeability μ (before exposure to after exposure) was calculated. Table 1 shows the results. The closer the rate of change is to 0, the more preferable it is.

<Glass-Transition Temperature (Tg)>

The dust core sample was pulverized with a mortar into a powder, and the glass-transition temperature (Tg) of the powder was measured with a differential scanning calorimetry apparatus at a heating rate of 5° C./min. Table 1 shows the results. A glass-transition temperature of 170° C. or higher is preferable.

<Withstand Voltage>

A pair of In—Ga electrodes was formed on the toroidal dust core sample. A voltage was applied to this dust core sample to measure a voltage at which a current of 100 mA flowed. This measured value was divided by the thickness of the dust core in the direction in which the dust core is sandwiched between the electrodes to give the withstand voltage (V). Table 1 shows the results. The higher the withstand voltage, the more preferable it is.

<Moldability>

The moldability was evaluated by observing whether the molded article adhered to the mold and checking for rupture or other damage when the molded article was removed from the mold after heat-press molding. When neither adherence to the mold nor rupture was observed for one hundred molded articles (samples), the moldability was evaluated as "G". When adherence to the mold or rupture was observed for at least one of ten molded articles (samples), the moldability was evaluated as "B". When both adherence to the mold and rupture were observed at the same time for at least one of ten molded articles (samples), the moldability was evaluated as "VB". Table 1 shows the results.

<Degree of Decomposition of Binder Resin Alone>

Not the dust core sample, but the binder resin, the hardening agent, and the hardening accelerator were dissolved in the solvent. This article was poured into a mold for molding. The molded article was dried to remove the solvent and was heat-hardened. A test piece having a predetermined size was thus produced.

Figure 3:
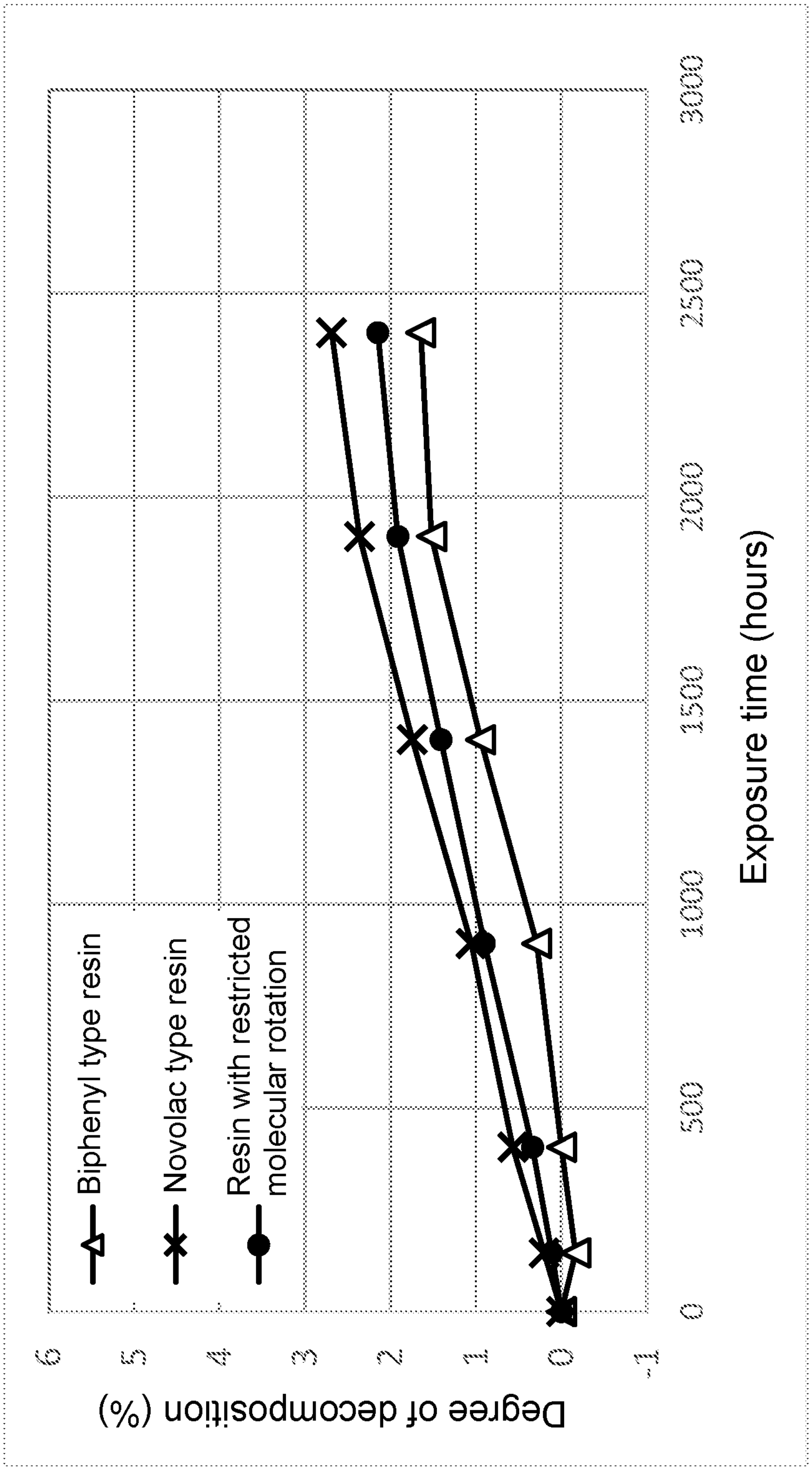
FIG. 3 is a graph showing changes in the degree of decomposition of binder resins alone used in an example and comparative examples of the present invention.

The test piece (sample of the molded binder resin article alone) was exposed to an environment at 180° C. for 2400 hours. Per predetermined amount of time passed, the degree of decomposition was examined. Black dots plotted in FIG. 3 show the results. In FIG. 3, the horizontal axis shows the amount of exposure time, and the vertical axis shows the degree of decomposition (%). Measurement of the degree of decomposition was performed by measuring a degree of weight reduction with an electronic scale.

Comparative Example 1

Except that an ortho-cresol novolac type epoxy resin was used as a binder and a phenol novolac epoxy resin was used as a hardening agent, a dust core sample was produced as in Example 1 for evaluation as in Example 1. Table 1 shows the results. X marks plotted in FIG. 3 show the results of measuring, similarly to Example 1, the degree of decomposition of the binder resin alone of Comparative Example 1.

Comparative Example 2

Except that a mixture of the ortho-cresol novolac type epoxy resin and a maleimide-denatured epoxy resin was used as a binder and the phenol novolac epoxy resin was used as a hardening agent, a dust core sample was produced as in Example 1 for evaluation as in Example 1. Table 1 shows the results.

Comparative Example 3

Except that a diphenyl ether type epoxy resin was used as a binder and the phenol novolac epoxy resin was used as a hardening agent, a dust core sample was produced as in Example 1 for evaluation as in Example 1. Table 1 shows the results.

Comparative Example 4

Except that a naphthalene type epoxy resin was used as a binder and a naphthalene type hardening agent was used as a hardening agent, a dust core sample was produced as in Example 1 for evaluation as in Example 1. Table 1 shows the results.

Comparative Example 5

Except that a biphenylene type epoxy resin was used as a binder and a biphenyl aralkyl type phenol resin was used as a hardening agent, a dust core sample was produced as in Example 1 for evaluation as in Example 1. Table 1 shows the results. Triangular marks plotted in FIG. 3 show the results of measuring, similarly to Example 1, the degree of decomposition of the binder resin alone of Comparative Example 5.

Comparative Example 6

Except that a polyfunctional epoxy resin was used as a binder and a polyfunctional phenol resin was used as a hardening agent, a dust core sample was produced as in Example 1 for evaluation as in Example 1. Table 1 shows the results.

Example 2

Except that a metal powder composed of any of an Fe—Ni based alloy, an Fe—Si based alloy, an Fe—Co based alloy, an Fe—Si—Cr based alloy, and an Fe—Si—Al based alloy was used instead of the Fe—Si—Cr—B—C composition based amorphous metal powder as the magnetic particles 12, evaluation was performed as in Example 1. It was confirmed that the results were the same as in Example 1.

Example 3

Except that the Fe—Si—Cr—B—C composition based amorphous metal powder with a D50 of 25 μm was used at 100 mass % as the magnetic particles 12, evaluation was performed as in Example 1. It was confirmed that the results were the same as in Example 1.

Evaluation

As shown in Table 1, Example 1, in which the predetermined bisphenol type epoxy resin having a structure with restricted molecular rotation was used, had a smaller change of core weight and smaller degradation of magnetic properties even upon a long-time exposure to a high-temperature environment, compared to Comparative Examples 1 to 6. Also in Example 1, it was confirmed that the glass-transition temperature (Tg) was 170° C. or higher, that the withstand voltage was as high as 300 V or more, and that the moldability was good. Note that, in Comparative Examples 1 to 6, these properties were not satisfactory at the same time.

As shown in FIG. 3, changes of degree of decomposition over time in the high-temperature environment were not much different between Example 1 (the resin with restricted molecular rotation) and Comparative Example 1 (the novolac type resin) or Comparative Example 5 (the biphenyl type resin) in terms of the resins alone. However, as shown in Table 1, the dust core sample of Example 1 showed better results than the dust core samples of Comparative Examples 1 to 6. It is believed that this is because a negative catalysis has occurred between the metal magnetic particles and the resin with restricted molecular rotation to exhibit effects that cannot be expected from the resin alone.

TABLE 1

| | Rate of change of core weight (%)/ 180° C., 660 hours | Rate of change of μ (%)/ 180° C., 1100 hours | Tg/ TMA (° C.) | Relative perme-ability μ | With-stand voltage (V) | Moldability (adherence to mold, rupture) |
|---|---|---|---|---|---|---|
| Comparative Example 1 | −0.829 | 5.64 | 188 | 21.5 | 70 | G |
| Comparative Example 2 | −0.748 | 4.94 | 192 | 22.0 | 90 | G |
| Comparative Example 3 | −0.522 | 0.68 | 123 | 24.2 | 680 | VB |
| Comparative Example 4 | −0.616 | 3.11 | 152 | 22.3 | 280 | B |
| Comparative Example 5 | 0.064 | −3.1 | 132 | 24.2 | 430 | VB |
| Example 1 | −0.128 | −0.58 | 190 | 21.2 | 420 | G |
| Comparative Example 6 | −0.242 | −1.37 | 155 | 21.5 | 230 | G |

NUMERICAL REFERENCES

2 . . . inductor
4 . . . element body (dust core)
4*a* . . . upper surface
4*b* . . . bottom surface
4*c*, 4*d* . . . end surface
5 . . . coil
6 . . . wire
6*a* . . . lead portion
8 . . . terminal electrode
10 . . . granule (complex magnetic composition)
12 . . . magnetic particle
14 . . . binder

What is claimed is:

1. A complex magnetic composition comprising:

a binder including a bisphenol type epoxy resin with restricted molecular rotation; and magnetic particles bound together by the binder.

2. The complex magnetic composition according to claim 1, wherein the bisphenol type epoxy resin comprises molecules having an amide structure.

3. The complex magnetic composition according to claim 1, wherein the bisphenol type epoxy resin comprises aromatic rings having a conjugated structure.

4. The complex magnetic composition according to claim 1, wherein the bisphenol type epoxy resin comprises aromatic rings conjugated via an imide bond.

5. The complex magnetic composition according to claim 1, wherein the magnetic particles comprise metal magnetic particles.

6. The complex magnetic composition according to claim 5, wherein the metal magnetic particles comprise amorphous metal.

7. The complex magnetic composition according to claim 5, wherein the metal magnetic particles comprise pure Fe.

8. The complex magnetic composition according to claim 1, wherein the magnetic particles are spherical.

9. A magnetic member comprising the complex magnetic composition according to claim 1.

10. An electronic component comprising the magnetic member according to claim 9.

11. The electronic component according to claim 10, wherein the magnetic member is a dust core.

12. The electronic component according to claim 11, wherein the dust core comprises a coil inside.

* * * * *